(12) United States Patent
Nishimura

(10) Patent No.: US 7,358,642 B2
(45) Date of Patent: Apr. 15, 2008

(54) DYNAMOELECTRIC ROTOR

(75) Inventor: Shinji Nishimura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 11/583,908

(22) Filed: Oct. 20, 2006

(65) Prior Publication Data
US 2007/0267937 A1  Nov. 22, 2007

(30) Foreign Application Priority Data
May 17, 2006 (JP) .............................. 2006-137858

(51) Int. Cl.
*H02K 11/00* (2006.01)
(52) U.S. Cl. ........................ 310/263; 310/71
(58) Field of Classification Search ................. 310/263
See application file for complete search history.

(56) References Cited

U.S. PATENT DOCUMENTS

| 5,955,804 | A  | * | 9/1999  | Kusase et al. ............... 310/59 |
| 6,501,207 | B2 | * | 12/2002 | Oohashi et al. ............ 310/263 |
| 6,853,111 | B2 | * | 2/2005  | Umeda et al. ............. 310/263 |
| 2002/0047482 | A1 | * | 4/2002 | Oohashi et al. ............. 310/263 |

FOREIGN PATENT DOCUMENTS

| JP | 54025487 A | * | 2/1979 |
| JP | 59-1401 Y2 |   | 1/1984 |
| JP | 59178935 A | * | 10/1984 |
| JP | 05-268753 A |   | 10/1993 |
| JP | 06086517 A | * | 3/1994 |

OTHER PUBLICATIONS

Machine translation of JP 06086517, Honda et al (8 pages).*

* cited by examiner

*Primary Examiner*—Darren Schuberg
*Assistant Examiner*—Naishadh N Desai
(74) *Attorney, Agent, or Firm*—Sughrue Mion, PLLC

(57) ABSTRACT

A field coil is housed inside a coil housing space of a pole core, and an annular body that is made of an insulating resin is fixed to a portion of a shaft that projects outward at a first end of the pole core. A pair of slip rings are fixed to the annular body so as to be separated axially, and a pair of connecting terminals are disposed on the annular body such that first ends are respectively connected to the pair of slip rings and second ends project radially outward from a flange portion of the annular body. In addition, a coil winding start end and winding finish end of the field coil are led out through a valley portion between first claw-shaped magnetic pole portions, and are respectively connected to projecting portions of the connecting terminals.

4 Claims, 3 Drawing Sheets

DYNAMOELECTRIC ROTOR

BACKGROUND OF THE INVENTION

1. Field of the Invention

The present invention relates to a dynamoelectric rotor for an automotive alternator, etc., and particularly relates to a lead construction for an output wire of a field coil.

2. Description of the Related Art

Conventional automotive alternator rotors include: a pair of field cores that are fixed to a rotating shaft; a field coil that is held between the pair of field cores; an annular body that is made of an insulating resin that is fixed integrally to the rotating shaft with the field cores and that has a flange portion that projects radially on an end portion near the field cores; and a pair of slip rings that are fixed to an outer portion of the annular body. A pair of leads for supplying current to the field coil are led out from positions on the field core that are on opposite sides of the rotating shaft and are connected to respective terminals of the slip rings (see Patent Literature 1, for example).

Patent Literature 1: Japanese Utility Model Publication No. SHO 59-1401 (Gazette)

In conventional automotive alternator rotors, because the pair of leads are led out from positions on the field cores that are on opposite sides of the rotating shaft, the number of turns of coil is reduced by one turn in a first circumferential half of the field coil. Thus, magnetomotive force of the field coil, which is expressed in ampere-turns, differs in the first circumferential half and a remaining second half. In other words, magnetomotive force that acts on a first half of magnetic poles and magnetomotive force that acts on a remaining second half of the magnetic poles differ from each other. As a result, one problem with conventional automotive alternators has been that the rotor is operated in a magnetically unbalanced state, generating magnetic noise. Moreover, because the frequency of the magnetic noise rises as the number of poles is increased, the magnetic noise becomes irritating.

SUMMARY OF THE INVENTION

The present invention aims to solve the above problems and an object of the present invention is to provide a dynamoelectric rotor that enables magnetic noise to be suppressed by reducing circumferential imbalances of magnetomotive force in a field coil.

In order to achieve the above object, according to one aspect of the present invention, there is provided a dynamoelectric rotor including: a pole core having: a boss portion; yoke portions that are respectively disposed so as to extend radially outward from two axial end edge portions of the boss portion; and a plurality of claw-shaped magnetic pole portions that are disposed so as to extend axially from outer circumferential portions of the yoke portions so as to intermesh with each other alternately; a field coil that is housed in a coil housing space that is surrounded by the boss portion, the yoke portions, and the claw-shaped magnetic pole portions; and a shaft that is inserted through a central axial position of the boss portion and that supports the pole core so as to be unable to rotate relatively. In addition, the present rotor includes: an annular body that is made of an insulating resin, that is fixed to a portion of the shaft projecting outward at a first end of the pole core, and that has a radially-projecting flange portion at an end near the pole core; a pair of slip rings that are fixed to outer circumferential portions of the annular body so as to be separated axially; and a pair of connecting terminals that are disposed on the annular body such that first ends are respectively connected to the pair of slip rings and second ends project radially outward from the flange portion. The dynamoelectric rotor is characterized in that a coil winding start end and winding finish end of the field coil are led out toward the annular body from the coil housing space within a range that is less than or equal to one magnetic pole pitch circumferentially, and respectively connected to projecting portions of the pair of connecting terminals.

According to the present invention, because the coil winding start end and winding finish end of the field coil are led out toward the annular body from the coil housing space within a range that is less than or equal to one magnetic pole pitch circumferentially, the number of turns of coil in the field coil is approximately equal over the entire circumference. Thus, circumferential imbalances of magnetomotive force in the field coil are reduced, and the occurrence of magnetic noise is suppressed.

DETAILED DESCRIPTION OF THE PREFERRED EMBODIMENTS

Embodiment 1

Figure 1:
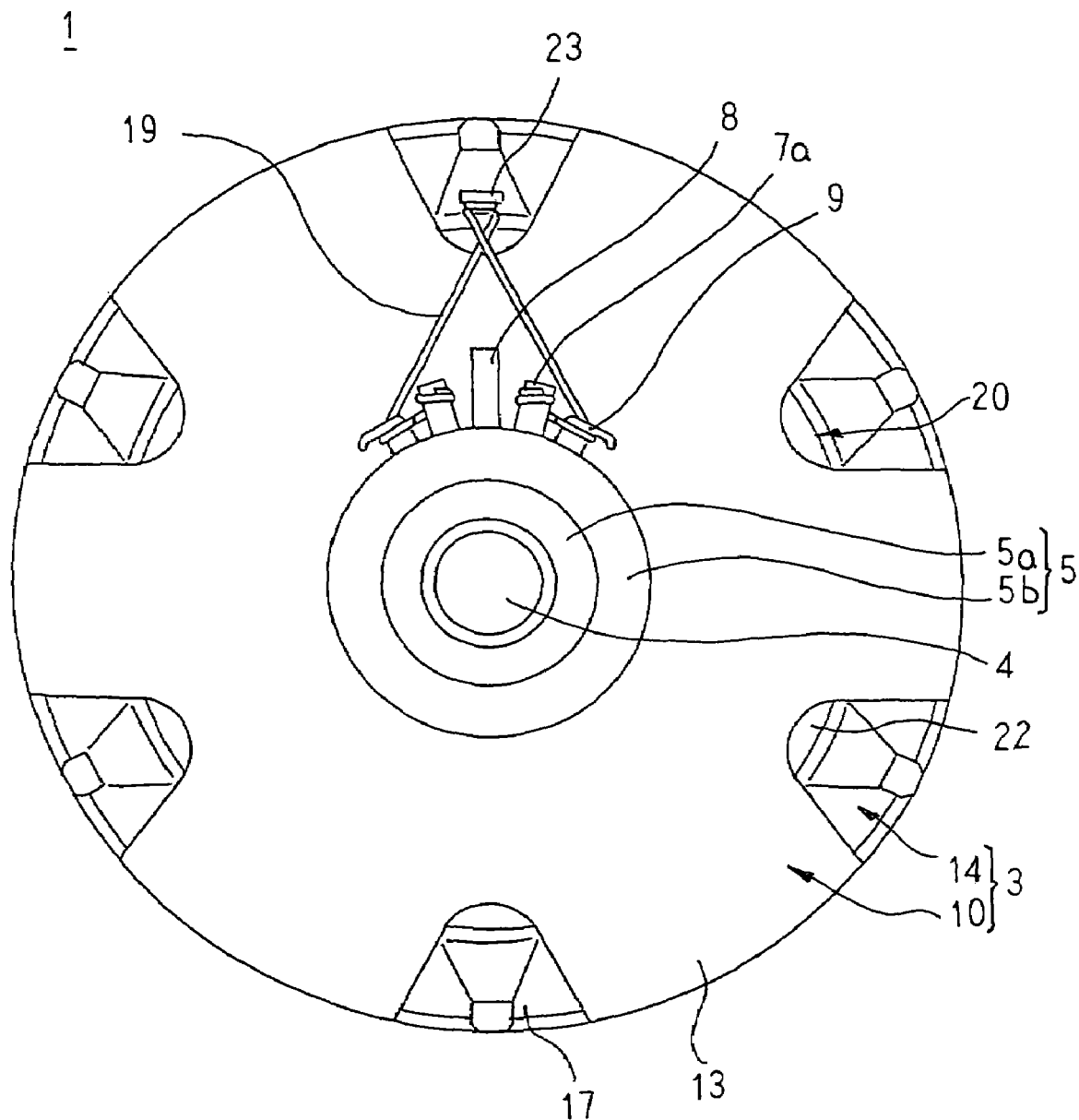
FIG. 1 is a front elevation of an automotive alternator rotor according to Embodiment 1 of the present invention.
Figure 2:
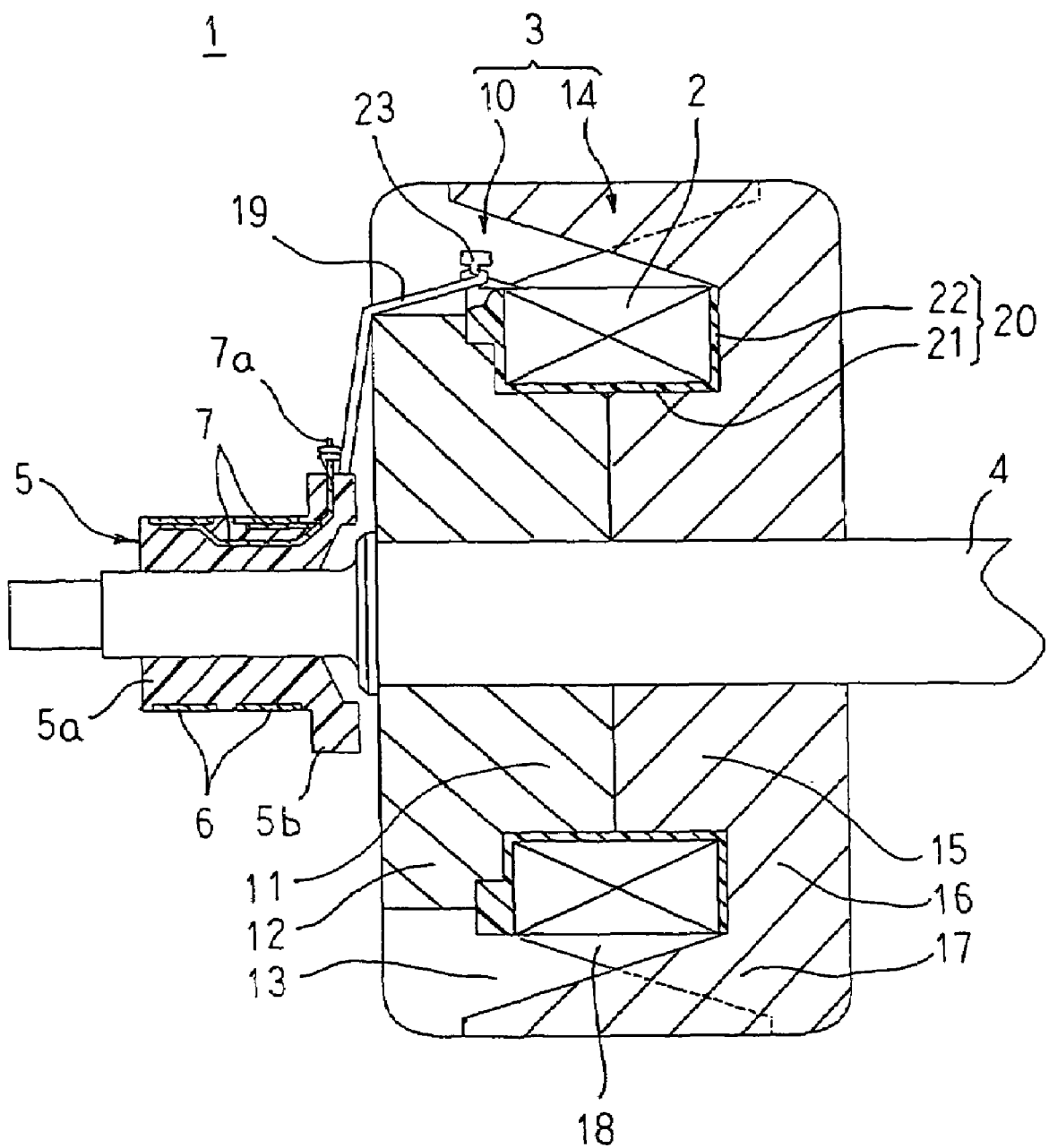
FIG. 2 is a cross section of the automotive alternator rotor according to Embodiment 1 of the present invention.

FIG. 1 is a front elevation of an automotive alternator rotor according to Embodiment 1 of the present invention, and FIG. 2 is a cross section of the automotive alternator rotor according to Embodiment 1 of the present invention.

In FIGS. 1 and 2, a rotor 1 includes: a field coil 2 that generates magnetic flux on passage of an excitation current; a pole core 3 that is disposed so as to cover the field coil 2 and in which magnetic poles are formed by that magnetic flux; a shaft 4 that is fitted through a central axial position of the pole core 3; an annular body 5 that is made of an insulating resin that is fixed to an end portion of the shaft 4 that projects outward at a first axial end of the pole core 3; and a pair of slip rings 6 for passing electric current to the field coil 2 that are fixed to the annular body 5.

The annular body 5 has: a cylindrical portion 5a that is fixed to the shaft 4; and a flange portion 5b that protrudes radially outward from a first end edge portion of the cylindrical portion 5a. The pair of slip rings 6 are fixed to an outer circumferential surface of the cylindrical portion 5a so as to be exposed and so as to be separated axially. A pair of connecting terminals 7 are disposed on the annular body 5 such that first ends thereof are respectively connected electrically to each of the slip rings 6 and second ends project radially outward from the flange portion 5b in close proximity circumferentially. A partitioning wall 8 is disposed so as to protrude from the flange portion 5b so as to separate a pair of projecting portions 7a. In addition, hook portions 9 are disposed so as to protrude from the flange portion 5b so as to be positioned circumferentially outside the pair of projecting portions 7a. Moreover, the partitioning wall 8 and the hook portions 9 are molded integrally on the annular body 5 using an insulating resin. The slip rings 6 and the connecting terminals 7 are insert-molded into the annular body 5.

The pole core 3 is constituted by first and second pole core bodies 10 and 14 that are each made of a low carbon steel using a forging method.

The first pole core body 10 has: a cylindrical first boss portion 11 through which a shaft insertion aperture is disposed at a central axial position; a thick ring-shaped first yoke portion 12 that is disposed so as to extend radially outward from a first end edge portion of the first boss portion 11; and first claw-shaped magnetic pole portions 13 that are disposed so as to extend toward a second axial end from outer circumferential portions of the first yoke portion 12. Six first claw-shaped magnetic pole portions 13, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arrayed on the outer circumferential portions of the first yoke portion 12 at a uniform angular pitch circumferentially.

Similarly, the second pole core body 14 has: a cylindrical second boss portion 15 through which a shaft insertion aperture is disposed at a central axial position; a thick ring-shaped second yoke portion 16 that is disposed so as to extend radially outward from a second end edge portion of the second boss portion 15; and second claw-shaped magnetic pole portions 17 that are disposed so as to project toward a first axial end from outer circumferential portions of the second yoke portion 16. Six second claw-shaped magnetic pole portions 17, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arrayed on the outer circumferential portions of the second yoke portion 16 at a uniform angular pitch circumferentially.

The first and second pole core bodies 10 and 14 are mounted so as to be unable to rotate relative to the shaft 4 that is press-fitted into the shaft insertion aperture of the first and second boss portions 11 and 15 in a state in which the first and second claw-shaped magnetic pole portions 13 and 17 face each other so as to intermesh with each other and end surfaces of the first and second boss portions 11 and 15 are abutted with each other. The annular body 5 is fixed to the shaft 4 such that the flange portion 5b is placed in close proximity to the first pole core body 10 and the projecting portions 7a of the connecting terminals 7 are positioned between circumferentially-adjacent first claw-shaped magnetic pole portions 13.

A bobbin 20 is molded into an approximate spool shape using an insulating resin, and includes: a cylindrical drum portion 21; a pair of disk-shaped flange portions 22 that are disposed so as to extend radially outward from first and second end edge portions of the drum portion 21; and one T-shaped output wire securing portion 23 that is disposed so as to extend radially outward from one of the flange portions 22.

The field coil 2 is prepared by winding a winding start end of a coil 19 onto the output wire securing portion 23, winding the coil 19 into multiple layers on the drum portion 21, and winding a winding finish end thereof onto the same output wire securing portion 23. The bobbin 20 is mounted to the pole core 3 by fitting the drum portion 21 over the first and second boss portions 11 and 15 with the field coil 2 already wound on. The field coil 2 is thereby housed inside a coil housing space 18 of the pole core 3 that is surrounded by the first and second boss portions 11 and 15, the first and second yoke portions 12 and 16, and the first and second claw-shaped magnetic pole portions 13 and 17. Here, the output wire securing portion 23 is positioned in a valley portion between adjacent first claw-shaped magnetic pole portions 13 of the first pole core body 10 radially outside the projecting portions 7a of the connecting terminals 7.

The winding start end of the coil 19 that has been wound onto the output wire securing portion 23 is led out through the valley portion between the adjacent first claw-shaped magnetic pole portions 13 of the first pole core body 10, hooked onto a first of the hook portions 9, and then connected to the projecting portion 7a of a first of the connecting terminals 7. Similarly, the winding finish end of the coil 19 that has been wound onto the output wire securing portion 23 is led out through the same valley portion between the adjacent first claw-shaped magnetic pole portions 13, is hooked onto a second of the hook portions 9, and then connected to the projecting portion 7a of a second of the connecting terminals 7.

In a rotor 1 that is configured in this manner, because the winding start end and the winding finish end of the coil 19 of the field coil 2 are led out through the same valley portion between circumferentially-adjacent first claw-shaped magnetic pole portions 13, portions of the winding start end and the winding finish end of the coil 19 that are led out from the coil housing space 18 are approximately aligned, making the number of turns of coil in the field coil 2 equal over the entire circumference. Thus, the magnetomotive forces of the field coil 2 that act on each of the claw-shaped magnetic pole portions 13 and 17 become equal, reducing magnetic imbalance and also reducing magnetic noise that results from the magnetic imbalance.

Consequently, adopting this configuration for a multipolar rotor that has twelve poles or more is particularly effective since the generation of irritating magnetic noise becomes more pronounced when the number of magnetic poles of a rotor is greater than or equal to twelve poles.

Because the winding start end and the winding finish end of the coil 19 are wound onto the output wire securing portion 23, the occurrence of winding disarray in the coil 19 can be suppressed, and workability when winding the coil 19 can be improved. Because the valley portion between the first claw-shaped magnetic pole portions 13 out of which the winding start end and the winding finish end of the coil 19 are led is positioned radially outside the projecting portions 7a of the pair of connecting terminals 7, the amount of leading around of the coil 19 can be reduced, enabling workability when connecting the coil 19 and the connecting terminals 7 to be improved.

Because the pair of projecting portions 7a are separated by the partitioning wall 8, electrically-insulation among the connection portions between the coil 19 and the projecting portions 7a can be ensured.

Moreover, If the amount of mechanical imbalance in the rotor 1 exceeds a specified value, it is desirable for the amount of imbalance to be adjusted so as to be less than or equal the specified value by shaving off portions of the first and second pole core bodies 10 and 14, boring apertures, or attaching weights, etc.

Embodiment 2

Figure 3:
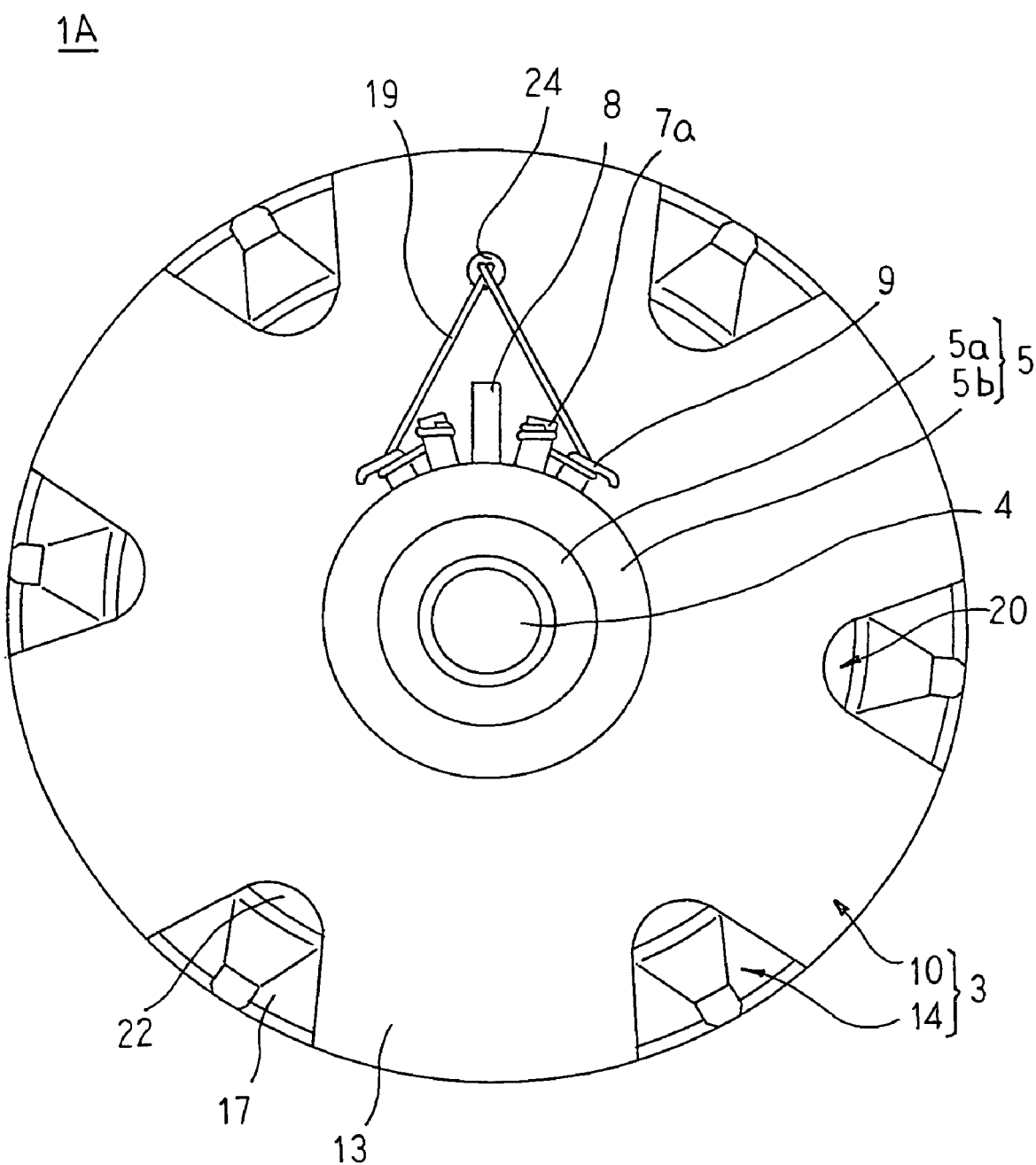
FIG. 3 is a front elevation of an automotive alternator rotor according to Embodiment 2 of the present invention.

FIG. 3 is a front elevation of an automotive alternator rotor according to Embodiment 2 of the present invention.

In FIG. 3, an annular body 5 is fixed to a shaft 4 such that a flange portion 5b is placed in close proximity to a first pole core body 10 such that a circumferentially-central position between projecting portions 7a of a pair of connecting terminals 7 is aligned with a circumferentially-central position of one first claw-shaped magnetic pole portion 13 of the first pole core body 10. A coil lead aperture 24 is disposed through a circumferentially-central position of a root portion of the first claw-shaped magnetic pole portion 13 in question. The winding start end of a coil 19 that has been wound onto a bobbin 20 is led out through the coil lead aperture 24, hooked onto a first hook portion 9, and then connected to the projecting portion 7a of a first of the connecting terminals 7. Similarly, the winding finish end of the coil 19 that has been wound onto the bobbin 20 is led out through the coil lead aperture 24, is hooked onto a second hook portion 9, and then connected to the projecting portion 7a of a second of the connecting terminals 7.

Moreover, the rest of this embodiment is configured in a similar manner to Embodiment 1 above.

In a rotor 1A that is configured in this manner, because the winding start end and the winding finish end of the coil 19 are led out through the same coil lead aperture 24, portions of the winding start end and the winding finish end of the coil 19 that are led out from the coil housing space 18 are approximately aligned, making the number of turns of coil in the field coil 2 equal over the entire circumference.

Thus, in Embodiment 2, the magnetomotive forces of the field coil 2 that act on each of the claw-shaped magnetic pole portions 13 and 17 also become equal, reducing magnetic imbalance and also reducing magnetic noise that results from the magnetic imbalance.

Now, in Embodiment 2 above, the winding start end and the winding finish end of the coil 19 are led out through one coil lead aperture 24, but the winding start end and the winding finish end of the coil 19 may also be respectively led out through different coil lead apertures. In that case, it is desirable for the two coil lead apertures to be disposed so as to line up radially.

If the two coil lead apertures are disposed so as to be offset circumferentially, it is desirable for the two coil lead apertures to be disposed within a range of a pitch of one magnetic pole or less. In that case, the number of turns of coil in the field coil becomes approximately equal over the entire circumference, reducing circumferential imbalances of magnetomotive force in the field coil and suppressing the occurrence of magnetic noise.

Moreover, in each of the above embodiments, the projecting portions 7a of the pair of connecting terminals 7 project outward from the flange portion 5b of the annular body 5 in close proximity circumferentially, but the projecting portions 7a of the pair of connecting terminals 7 may also project outward from the flange portion 5b at positions that are on opposite sides of the shaft 4. In that case, although the amount of lead around of the coil 19 is increased, the partitioning wall 8 can be eliminated.

In each of the above embodiments, cooling fans have not been described at all, but cooling fans may also be fixed to end surfaces of the first and second pole core bodies 10 and 14.

In each of the above embodiments, the pole core 3 is constituted by two parts, i.e., the firsthand second pole core bodies 10 and 14, but the pole core may also be constituted by three parts such as a boss portion and a pair of pole core bodies that hold the boss portion from opposite sides.

In each of the above embodiments, the bobbin 20 onto which the field coil 2 has been wound is mounted to the boss portions of the pole core, but the field coil may also be wound directly onto the boss portions of the pole core with an insulating material interposed.

In each of the above embodiments, the boss portions of the pole core 3 are formed so as to have a cylindrical shape, but the shape of the boss portions is not limited to a cylindrical shape, and may also be a polygonal prism shape, for example.

In each of the above embodiments, the present invention is explained as it applies to automotive alternator rotors, but the present invention is not limited to automotive alternators and similar effects are also exhibited if the present invention is applied to rotors for other dynamoelectric machines such as automotive alternating-current motors, automotive alternating-current generator-motors, etc.

What is claimed is:

1. A dynamoelectric rotor comprising:
   a pole core having:
      a boss portion;
      yoke portions that are respectively disposed so as to extend radially outward from two axial end edge portions of said boss portion; and
      a plurality of claw-shaped magnetic pole portions that are disposed so as to extend axially from outer circumferential portions of said yoke portions so as to intermesh with each other alternately;
   a bobbin having:
      a drum portion;
      a pair of disk-shaped flange portions that are disposed so as to extend radially outward from first and second edge portions of said drum portion; and
      an output wire securing portion that is disposed so as to extend radially outward from one of said disk-shaped flange portions, said bobbin being housed in a coil housing space that is surrounded by said boss portion, said yoke portions, and said claw-shaped magnetic pole portions by fitting said drum portion over said boss portion:
   a field coil that is wound on said bobbin housed in said coil housing space by winding a winding start end thereof onto said output wire securing portion, winding on said drum portion, and winding a winding finish end thereof onto said output wire securing portion;
   a shaft that is inserted through a central axial position of said boss portion and that supports said pole core so as to be unable to rotate relatively;
   an annular body that is made of an insulating resin, that is fixed to a portion of said shaft projecting outward at a first end of said pole core, and that has a radially-projecting flange portion at an end near said pole core;
   a pair of slip rings that are fixed to outer circumferential portions of said annular body so as to be separated axially; and
   a pair of connecting terminals that are disposed on said annular body such that first ends are respectively connected to said pair of slip rings and second ends project radially outward from said radially-projecting flange portion,
   wherein said coil winding start end and winding finish end of said field coil are led out toward said annular body from said output wire securing portion within a range that is less than or equal to one magnetic pole pitch circumferentially, and respectively connected to projecting portions of said pair of connecting terminals.

2. A dynamoelectric rotor comprising:
   a pole core having:
      a boss portion;
      yoke portions that are respectively disposed so as to extend radially outward from two axial end edge portions of said boss portion; and a plurality of claw-shaped magnetic pole portions that are disposed so as to extend axially from outer circumferential portions of said yoke portions so as to intermesh with each other alternately;

a field coil that is housed in a coil housing space that is surrounded by said boss portion, said yoke portions, and said claw-shaped magnetic pole portions;

a shaft that is inserted through a central axial position of said boss portion and that supports said pole core so as to be unable to rotate relatively;

an annular body that is made of an insulating resin, that is fixed to a portion of said shaft projecting outward at a first end of said pole core, and that has a radially-projecting flange portion at an end near said pole core;

a pair of slip rings that are fixed to outer circumferential portions of said annular body so as to be separated axially; and a pair of connecting terminals that are disposed on said annular body such that first ends are respectively connected to said pair of slip rings and second ends project radially outward from said flange portion, wherein a coil winding start end and winding finish end of said field coil are led out toward said annular body from said coil housing space within a range that is less than or equal to one magnetic pole pitch circumferentially, and respectively connected to projecting portions of said pair of connecting terminals, and wherein said coil winding start end and winding finish end of said field coil are led out through a same valley portion between circumferentially-adjacent claw-shaped magnetic pole portions.

3. A dynamoelectric rotor comprising:

a pole core having:

a boss portion;

yoke portions that are respectively disposed so as to extend radially outward from two axial end edge portions of said boss portion; and a plurality of claw-shaped magnetic pole portions that are disposed so as to extend axially from outer circumferential portions of said yoke portions so as to intermesh with each other alternately;

a field coil that is housed in a coil housing space that is surrounded by said boss portion, said yoke portions, and said claw-shaped magnetic pole portions;

a shaft that is inserted through a central axial position of said boss portion and that supports said pole core so as to be unable to rotate relatively;

an annular body that is made of an insulating resin, that is fixed to a portion of said shaft projecting outward at a first end of said pole core, and that has a radially-projecting flange portion at an end near said pole core;

a pair of slip rings that are fixed to outer circumferential portions of said annular body so as to be separated axially; and a pair of connecting terminals that are disposed on said annular body such that first ends are respectively connected to said pair of slip rings and second ends project radially outward from said flange portion, wherein a coil winding start end and winding finish end of said field coil are led out toward said annular body from said coil housing space within a range that is less than or equal to one magnetic pole pitch circumferentially, and respectively connected to projecting portions of said pair of connecting terminals, and wherein said coil winding start end and winding finish end of said field coil are led out through a same coil lead aperture that is disposed through said pole core near a root of a claw-shaped magnetic pole portion.

4. A dynamoelectric rotor according to claim 1, wherein the number of magnetic poles in said pole core is greater than or equal to twelve poles.

* * * * *